(No Model.)

T. HAWKEN.
INSULATOR BLOCK FOR ELECTRIC CONDUCTORS.

No. 346,475. Patented Aug. 3, 1886.

Witnesses:
John A. Rennie
John F. C. Pritchard

Inventor,
Thomas Hawken
by Crosby & Gregory
attys.

N. PETERS, Photo-Lithographer, Washington, D. C.

UNITED STATES PATENT OFFICE.

THOMAS HAWKEN, OF SALEM, MASSACHUSETTS.

INSULATOR-BLOCK FOR ELECTRIC CONDUCTORS.

SPECIFICATION forming part of Letters Patent No. 346,475, dated August 3, 1886.

Application filed March 11, 1886. Serial No. 194,825. (No model.)

*To all whom it may concern:*

Be it known that I, THOMAS HAWKEN, of Salem, county of Essex, and State of Massachusetts, have invented an Improvement in Insulator-Blocks for Electric Conductors, of which the following description, in connection with the accompanying drawings, is a specification, like letters on the drawings representing like parts.

This invention has for its object to provide an electric wire or conductor with efficient means for preventing the escape of the electric current when the wire or conductor is brought in contact, by accident or otherwise, with bodies possessing more or less conductivity.

The invention consists of an elongated insulated block mounted upon the wire or conductor and fastened thereto by suitable means, said block being mounted upon the wire at places where the same is liable to be brought in contact with conducting-bodies. The insulator-block, in this instance, consists of a longitudinally-divided block placed upon the wire, and the fastening herein shown consists of a piece of wire surrounding the ends of the block and coiled about the wire or conductor.

Figure 1:
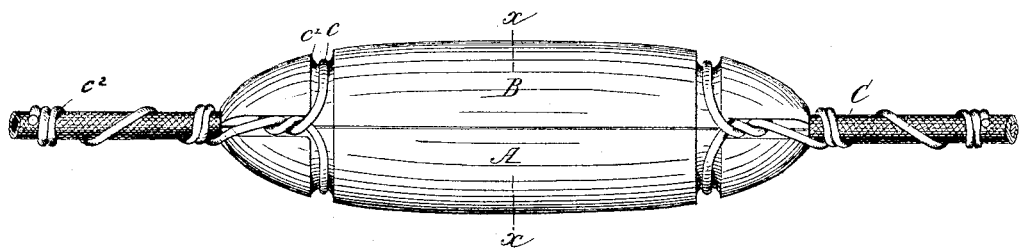
Figure 2:
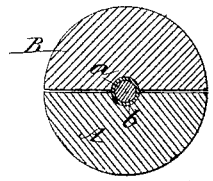

Figure 1 shows in elevation an insulator-block embodying this invention; and Fig. 2, a cross-section taken on the dotted line $x\ x$, Fig. 1.

The elongated insulator-block is shown in this instance as divided longitudinally into two parts, A B, each of the said parts being grooved longitudinally, as at $a\ b$, to receive the electric wire or conductor C when the two parts are abutted together. The divided block A B, thus pressed upon the wire, is secured in position by fastening devices, herein shown as a tie-wire, one end of which, as $c$, passes around the ends of the block A B in the groove $c'$, the remaining portion, $c^2$, being wound or coiled about the wire or conductor C. Similar fastening devices or tie-wires are supplied at each end of the elongated insulator-block.

It is obvious that the block may be divided into several sections, if desired, and all be bound together to form a complete insulated covering or shield for a short section of the wire or conductor, and it is also obvious that other fastening devices may be equally as efficient as the tie-wire herein described.

The block herein described is usually made of wood or similar inexpensive insulating material—such, for instance, as glass, porcelain, or it may be hard rubber—and usually of four to six inches in length, and, when placed upon the wire or conductor at a point where limbs of trees, &c., are brought in contact with the wire or conductor, is of especial advantage in preventing the escape of the electric current, which upon telephone-wires running through rural districts is very considerable.

I claim—

1. An insulator-block for use in insulating electric conductors at such points other than their supports as they are liable to come into contact with foreign conducting-bodies, the same consisting of the elongated sectional body A B, of non-conducting material, inclosing the conductor and secured thereon by fasteners $c$, substantially as shown and described.

2. An insulating-block comprising a plurality of matched sections grooved to inclose or surround the wire, and the fastening devices $c$, bound around the said sections at or near their opposite ends, for uniting such sections, and fastened to the conductor to hold the block in place, substantially as described.

3. An insulator for electric conductors, consisting of elongated internally-grooved sections A B and the wires $c$, laid in grooves $c'$ in said sections, substantially as described.

In testimony whereof I have signed my name to this specification in the presence of two subscribing witnesses.

THOMAS HAWKEN.

Witnesses:
BERNICE J. NOYES,
F. CUTTER.